United States Patent
Boutin et al.

(10) Patent No.: US 10,955,541 B2
(45) Date of Patent: Mar. 23, 2021

(54) APPARATUS AND METHOD FOR RF INTERFERENCE AVOIDANCE IN AN AUTOMOTIVE DETECTION SYSTEM

(71) Applicant: Veoneer US, Inc., Southfield, MI (US)

(72) Inventors: Alain Boutin, Londonderry, NH (US); Michael Paradie, Hollis, NH (US)

(73) Assignee: VEONEER US, INC., Southfield, MI (US)

( * ) Notice: Subject to any disclaimer, the term of this patent is extended or adjusted under 35 U.S.C. 154(b) by 440 days.

(21) Appl. No.: 15/689,264

(22) Filed: Aug. 29, 2017

(65) Prior Publication Data

US 2019/0064335 A1 Feb. 28, 2019

(51) Int. Cl.
| | |
|---|---|
| *G01S 13/22* | (2006.01) |
| *G01S 13/38* | (2006.01) |
| *G01S 7/02* | (2006.01) |
| *G01S 7/292* | (2006.01) |
| *G01S 13/24* | (2006.01) |
| *G01S 13/931* | (2020.01) |
| *G01S 7/40* | (2006.01) |

(52) U.S. Cl.
CPC ............ *G01S 13/225* (2013.01); *G01S 7/023* (2013.01); *G01S 7/2921* (2013.01); *G01S 13/24* (2013.01); *G01S 13/38* (2013.01); *G01S 13/931* (2013.01); *G01S 2007/406* (2013.01)

(58) Field of Classification Search
CPC ...... G01S 13/225; G01S 7/023; G01S 7/2921; G01S 13/24; G01S 13/38; G01S 2007/406
USPC ......................................................... 342/70
See application file for complete search history.

(56) References Cited

U.S. PATENT DOCUMENTS

| | | | |
|---|---|---|---|
| 5,280,288 A * | 1/1994 | Sherry | G01S 7/023 342/83 |
| 7,430,257 B1 * | 9/2008 | Shattil | H04B 1/707 342/367 |

(Continued)

FOREIGN PATENT DOCUMENTS

| | | | |
|---|---|---|---|
| EP | 1775600 A1 * | 4/2007 | ........... G01S 13/222 |
| EP | 1775600 A1 | 4/2007 | |

(Continued)

OTHER PUBLICATIONS

International Search Report and Written Opinion in corresponding International Application No. PCT/US2018/047943, dated Nov. 30, 2018; 16 pages.

*Primary Examiner* — Vladimir Magloire
*Assistant Examiner* — Nuzhat Pervin
(74) *Attorney, Agent, or Firm* — Burns & Levinson LLP; Steven M. Mills (57) ABSTRACT

A method of mitigates RF interference from an RF interferer. An RF signal is received at an RF transceiver during a time period. The RF signal that includes, for at least a portion of the time period, an interference signal having a cyclic transmission pattern with at least one deterministic feature. The received RF signal is analyzed in order to determine timing information for the at least one deterministic feature and the associated interference signal cyclic transmission pattern. Transmission of the RF signals from the RF transceiver are synchronized with the interference signal transmission pattern based on the determined timing information to mitigate interference between the RF signals and the interference signal.

20 Claims, 8 Drawing Sheets

(56) References Cited

U.S. PATENT DOCUMENTS

| | | | | |
|---|---|---|---|---|
| 7,593,449 B2* | 9/2009 | Shattil | .................... | H04B 1/707 375/130 |
| 7,965,761 B2* | 6/2011 | Shattil | ................ | H04L 27/2697 375/147 |
| 8,000,376 B2* | 8/2011 | Chari | .................... | H04B 1/715 375/136 |
| 8,295,395 B2* | 10/2012 | Mueck | ................... | H04B 15/00 375/296 |
| 8,711,038 B2* | 4/2014 | Reede | .................... | G01S 13/82 342/458 |
| 8,767,595 B2* | 7/2014 | Haverty | ................... | H04K 3/45 370/287 |
| 9,054,791 B2* | 6/2015 | Mueck | ................. | H04L 5/0016 |
| 9,223,009 B1* | 12/2015 | Wasiewicz | .............. | G01S 13/24 |
| 2007/0211786 A1* | 9/2007 | Shattil | .................... | H04J 13/00 375/141 |
| 2008/0112518 A1* | 5/2008 | Wilhelmsson | ...... | H04L 27/2647 375/348 |
| 2009/0110033 A1* | 4/2009 | Shattil | ................ | H04J 14/0298 375/141 |
| 2009/0185599 A1* | 7/2009 | Chari | ................ | H04B 1/715 375/132 |
| 2010/0080323 A1* | 4/2010 | Mueck | ................ | H04L 5/0016 375/296 |
| 2010/0091753 A1* | 4/2010 | Wigren | ................ | H04B 17/345 370/342 |
| 2010/0302956 A1* | 12/2010 | Haverty | ................... | H04K 3/28 370/252 |
| 2011/0009070 A1* | 1/2011 | Wigren | ................ | H04B 17/345 455/67.13 |
| 2011/0021222 A1* | 1/2011 | Wigren | ................ | H04B 17/373 455/501 |
| 2011/0298651 A1* | 12/2011 | Nakagawa | ............ | G01S 7/2927 342/146 |
| 2012/0032855 A1* | 2/2012 | Reede | .................... | G01S 13/82 342/458 |
| 2012/0064935 A1* | 3/2012 | Hakola | ................. | H04W 72/02 455/513 |
| 2012/0313814 A1* | 12/2012 | Kojima | ................... | G01S 13/28 342/201 |
| 2013/0115986 A1* | 5/2013 | Mueck | ............. | H04W 72/1226 455/501 |
| 2013/0342381 A1* | 12/2013 | Nakagawa | ............. | G01S 7/023 342/90 |
| 2015/0305055 A1* | 10/2015 | Mueck | ................ | H04J 11/0033 370/329 |

FOREIGN PATENT DOCUMENTS

| | | | | |
|---|---|---|---|---|
| EP | 1883193 A2 * | 1/2008 | ............... | H04L 1/22 |
| EP | 2277153 A1 * | 1/2011 | ......... | G08B 13/2488 |
| EP | 2277153 A1 | 1/2011 | | |
| EP | 3306339 A1 * | 4/2018 | .......... | G01S 13/343 |
| EP | 3306339 A1 | 4/2018 | | |
| WO | 2009142688 A1 | 11/2009 | | |
| WO | WO-2010039585 A2 * | 4/2010 | ........ | H04W 72/1226 |

\* cited by examiner

APPARATUS AND METHOD FOR RF INTERFERENCE AVOIDANCE IN AN AUTOMOTIVE DETECTION SYSTEM

BACKGROUND

Field of the Invention

The subject disclosure relates to automotive detection systems, e.g., radar systems, and, in particular, to an apparatus and method for detecting and correcting for interference from third party detection systems.

Discussion of Related Art

In automotive detections systems, such as radar systems, the sensor, i.e., radar sensor can be mounted, i.e., physically attached, to the vehicle body or frame. Detection system performance is typically characterized by detection of reflections from objects in proximity to the vehicle to enable implementation of speed control and collision preventions, blind spot detection, proximity warning, peripheral traffic display, redundancy check for vision system, self driving.

In some cases, automotive detection systems can be rendered inaccurate or unworkable due to outside interference sources. For example, third party detection systems (interferers) often send sweeps which superpose and interfere with the automotive detection system of a given vehicle (the victim). This can cause the echo collected by the victim to be buried by the direct wave of the interferer.

SUMMARY

In light of the needs described above, in at least one aspect, there is a need for a system which mitigates or avoids RF interference from outside sources.

In at least one aspect, the subject technology relates to a method of mitigating RF interference from an RF interferer. An RF signal is received at an RF transceiver during a time period. The RF signal includes, for at least a portion of the time period, an interference signal having a cyclic transmission pattern with at least one deterministic feature. The received RF signal is analyzed in order to determine timing information for the at least one deterministic feature and the associated interference signal cyclic transmission pattern. Transmission of the RF signals from the RF transceiver are synchronized with the interference signal transmission pattern based on the determined timing information to mitigate interference between the RF signals and the interference signal.

In some embodiments, the interference signal includes a direct wave from an interferer RF transceiver. The receiving RF transceiver and the interferer RF transceiver can transmit in the same frequency band. In some embodiments, analyzing the received RF signal includes measuring the power envelope of the received RF signal to identify the at least one deterministic feature and timing information associated therewith. The deterministic feature and timing information associated therewith are then compared to one or more known deterministic features associated with RF power envelope transmission patterns to identify a starting time and an ending time for the interference signal cyclic transmission pattern. In some cases, the power envelope includes application of a sliding power window to the RF received signal.

In some embodiments, one or more known deterministic features are accessed from a library of known transmission patterns for RF interferers. The interference signal transmission pattern can include at least one transition between RF transmission frequencies. Receiving the RF signal can include scanning on a plurality of RF frequencies at random time intervals. In some embodiments, synchronizing can include temporally alternating the transmission of the RF signals with the determined timing of the cyclic transmission pattern of the interference signal. Synchronizing can also include temporally delaying the transmission of the RF signals with respect to the determined timing of the cyclic transmission pattern of the interference signal. In some cases, synchronizing can include adjusting the transmission frequency of the RF signals based on at least one maximum collision point between the interference signal and previously transmitted RF signals. Further, synchronizing can include temporally adjusting the transmission of the RF signals to transmit only when noise from the interfering signal is below a maximum noise threshold. Synchronizing can also include modifying the transmission pattern of the RF signals and aligning the transmission timing of the modified RF signals with the determined timing of the cyclic transmission pattern of the interference signal.

In some embodiments, the transmitted RF signals can be adjusted to have a cyclic transmission pattern that matches the cyclic transmission pattern of the interference signal. In some cases, the at least one deterministic feature occurs at a known temporal offset from the start and end of a known cyclic transmission pattern. The at least one deterministic feature can include a power amplitude characteristic such as a slope value, a geometric shape, volume, height, or a higher order derivative value.

In at least one aspect, the subject technology relates to an RF transceiver configured to mitigate RF interference from an interference signal. An RF receiving module is configured to receive, during a time period, an RF signal that includes for at least a portion of the time period an interference signal having a periodic cyclic transmission pattern with at least one deterministic feature. An interference detector is configured to analyze the received RF signal in order to determine timing information for the at least one deterministic feature and the associated interference signal cyclic transmission pattern. An RF transmitter is configured to synchronize transmission of RF signals with the interference signal cyclic transmission pattern based on the timing information to mitigate interference between the RF signals and the interference signal.

In some embodiments, the RF transceiver includes an automotive radar transceiver. The interference detector can also include a controller. The controller can measure, through a sliding power window or other correlation power detection method, data for time interval samples of the received RF signal to identify the at least one deterministic feature and timing information associated therewith. Further, the controller can compare the identified at least one deterministic feature to one or more known deterministic features associated with known RF transmission patterns to identify a starting time and an ending time for the interference signal cyclic transmission pattern. In some embodiments, the controller is further configured to access, from a library contained within memory, data related to the one or more known transmission patterns for detection systems such that the known transmission patterns can be compared to the received RF signal to identify the interferer based on the one or more deterministic features.

In some embodiments, the RF receiving module receives the RF signal by scanning on a plurality of RF frequencies at random time intervals. The RF transmitter can include a controller configured to synchronize the transmission of the RF signals by a number of techniques. One such technique involves temporally alternating the transmission of the RF signals with the determined timing of the cyclic transmission pattern of the interference signal. Another such technique involves temporally delaying the transmission of the RF signals with respect to the determined timing of the cyclic transmission pattern of the interference signal. One final such technique involves modifying the transmission pattern of the RF signals and aligning the transmission timing of the modified RF signals with the determined timing of the cyclic transmission pattern of the interference signal. In some cases, the at least one deterministic feature occurs at a known temporal offset from the start and end of a known cyclic transmission pattern.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

The subject technology overcomes many of the prior art problems associated with automotive detection systems. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e., where an "upper" part must always be on top).

Figure 1:
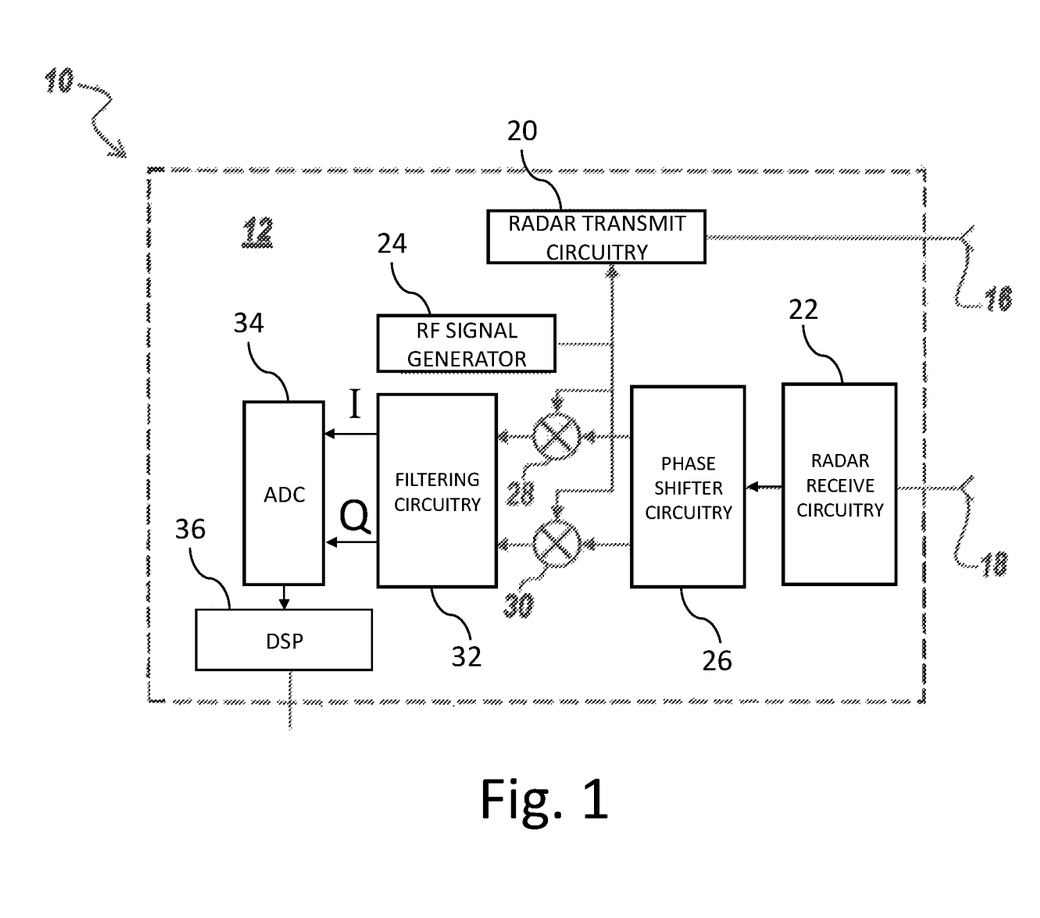
FIG. 1 is a schematic block diagram of an automotive radar sensor module for processing automotive radar signals in accordance with the subject technology.

Referring now to FIG. 1, a schematic block diagram of an automotive detection system 10, such as an automotive radar system, is shown. It is noted that the following detailed description refers to system 10 as an automotive radar system merely as an exemplary illustrative embodiment. The subject disclosure is directed to automotive detection systems in general and can be, for example, automotive radar systems or other such detection systems. The description herein of radar system components and signal processing are applicable to analogous components and signal processing of other detection systems.

The system 10 includes one or more detection modules such as radar sensor modules 12 for processing automotive radar signals in accordance with some exemplary embodiments. System 10 includes one or more radar modules 12 that process radar transmit and receive signals that are compatible with the radar detection and monitoring the system 10 in the host automobile. The radar module 12 generates and transmits radar signals into the region adjacent to the host vehicle that is being monitored by the system 10. Generation and transmission of signals is accomplished by an RF signal generator 24, radar transmit circuitry 20, and a transmit antenna 16 (or a plurality of transmit antennas). Radar transmit circuitry 20 generally includes any circuitry required to generate the signals transmitted via transmit antenna 16, such as pulse shaping/timing circuitry, transmit trigger circuitry, RF switch circuitry, or any other appropriate transmit circuitry used by the radar system 10.

The radar module 12 also receives returning radar signals through the radar receive circuitry 22 via a receive antenna 18 (or a plurality of receive antennas). Notably, the transmit antenna 16 and receive antenna 18 can also be combined into a single antenna that both transmits and receives. Radar receive circuitry 22 generally includes any circuitry required to process the signals received via the receive antenna 18, such as (amplification, gating, thresholding) RF switch circuitry, integrator, filters, or any other appropriate receive circuitry used by the radar system. The received radar signals are conditioned by the radar receive circuitry 22 to generate processed receive signals, which are forwarded to phase shifter circuitry 26, which generates an inphase (I) signal and a quadrature (Q) signal having a predetermined phase difference. These two signals, are mixed with an RF signal from an RF signal generator 24 by mixers 28, 30, respectively. The resulting difference signals are further filtered as required by filtering circuitry 32 to generate baseband I and Q signals, labeled "I" and "Q" in FIG. 1. The baseband I and Q signals are digitized by analog-to-digital converter circuitry (ADC) 34. In automotive radar systems, these digitized I and Q baseband signals are processed by a processor, such as a digital signal processor (DSP) 36, to generate target object detections related to objects in the region being monitored by radar system 10. In some exemplary embodiments, the DSP 36 can perform any and/or all of the processing tasks required to implement the sensor alignment monitoring, compensation and/or correction described herein according to the exemplary embodiments.

Figure 2:
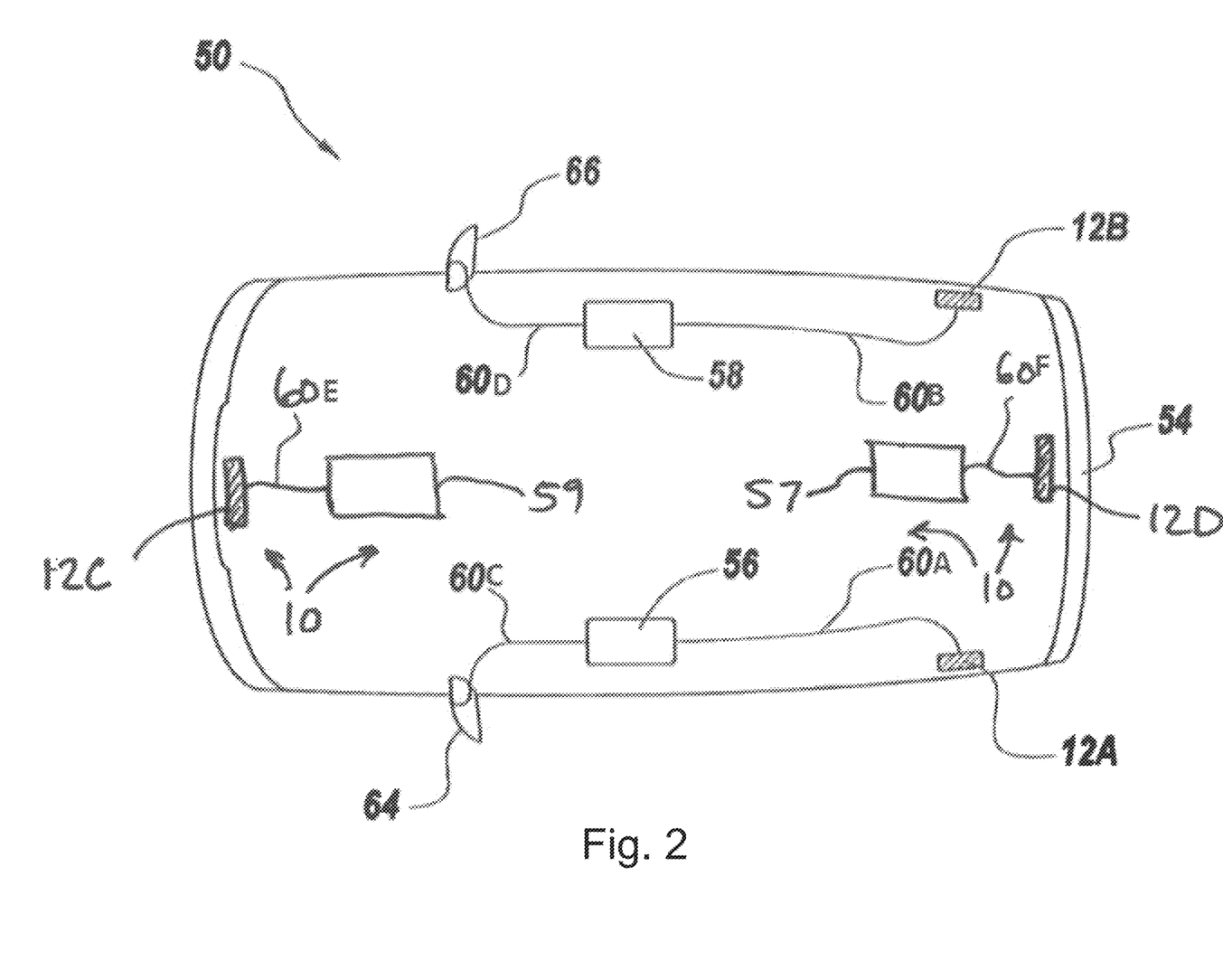
FIG. 2 is a schematic diagram of a host automobile equipped with a radar system in accordance with the subject technology.

Referring now to FIG. 2, a schematic top view of an automobile or vehicle 50 equipped with detection system 10 is shown. The vehicle 50 includes one or more radar sensor modules 12 spread out across the vehicle 50. A first radar sensor module 12A is connected via a bus 60A, which in some exemplary embodiments is a standard automotive controller area network (CAN) bus, to a first CAN bus electronic control unit (ECU) 56. Object detections from radar sensor module 12A can be reported to ECU 56, which processes the detections and can provide detection alerts via CAN bus 60C. In some exemplary embodiments, the alerts can be in the form of a visible indicator, such as a light-emitting diode (LED) in side mirror 64, which is visible to the driver. Additionally, or alternatively, alerts can be reported directly to an automatic braking system of the vehicle 50. Similarly, in some exemplary embodiments, a second radar sensor module 12B can be connected via CAN bus 60B, to a second CAN bus electronic control unit (ECU) 58. Object detections from radar sensor module 12B can be reported to ECU 58, which processes the detections and can provide detection alerts via CAN bus 60D to a visible indicator, such as a light-emitting diode (LED) in side mirror 66. In the particular embodiment illustrated in FIG. 2, first and second radar sensor modules 12A and 12B of radar system 10 are part of a blind spot system for reporting object detections in one or both blind spots of automobile 50. It will be understood that the present disclosure is applicable to other types of radar systems 10. For example, in some exemplary embodiments, forward-looking radar sensor module 12C can be connected via CAN bus 60E to a third CAN bus electronic control unit (ECU) 59, and rear-looking radar sensor module 12D can be connected via CAN bus 60F to a fourth CAN bus electronic control unit (ECU) 57. ECUs 57 and 59 can process target object detections from radar sensor modules 12C and 12D, respectively, and can provide detection alerts to a visible indicator or to a vehicle system process for appropriate processing and management of detections. The vehicle 50 shown in FIG. 2 is an example of a host vehicle which transmits and receives RF signals as part of an internal detection system, such as the system 10 of FIG. 1. It should be noted that these embodiments are given only as an example of a typical radar system and vehicle within which the subject technology might be incorporated. FIGS. 1-2 are in no way meant to be limiting of the applications of the subject technology.

At times, other signals can be broadcasted by transmitters from third party sources nearby. For example, other vehicles may transmit signals as part of their own radar systems. These signals can bury or otherwise affect the echo collected by the radar system 10 on the host vehicle 50, causing interference. In such a case, the radar sensor modules 12 on the host vehicle 50 become the "victim" sensors while the outside signal sent from the third party source, or interferer, become the "interferer" signal.

Figure 3:
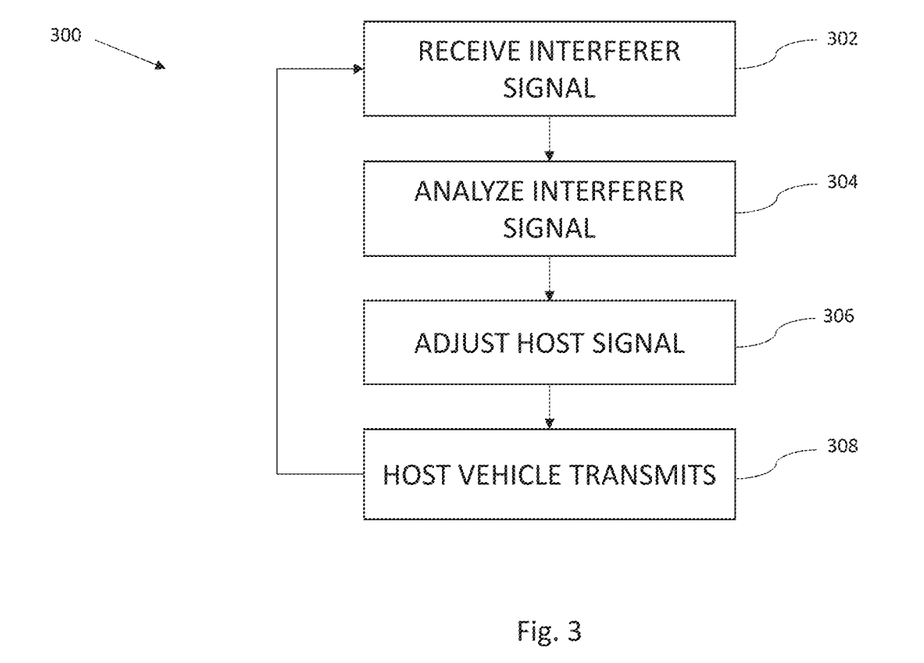
FIG. 3 is a simplified flowchart of a method of mitigating RF interference from a third party in accordance with the subject technology.

Referring now to FIG. 3, a simplified flowchart of a method of recognizing an interfering RF signal and adjusting the signal of a host vehicle, in accordance with the subject technology, is shown generally at 300. First, the host vehicle (or victim) begins scanning for other radio frequencies. For example, the host vehicle can scan a plurality of RF frequencies at random time intervals. Eventually, the host vehicle detects a radar signal from an interfering third party detection system (i.e., an interference signal from an interferer) at step 302. The interference signal may be a direct wave from an RF transceiver of an interferer transmitting at least partially within the same frequency band as the host vehicle. The interfering signal can be received with a radar sensor module 12 of a host vehicle, as described above. In various embodiments, the radar sensor module 12 can receive the signal at step 302 in either a listening mode (i.e., when it is not itself transmitting a signal) or while still transmitting its own signal. In many cases, the interfering signal will have a cyclic transmission pattern, repeating at identifiable intervals. When the interfering signal comes in, it is analyzed at step 304 and deterministic features of the signals cyclic transmission pattern are identified and analyzed. While various data can serve as deterministic features, as discussed in more detail below, the deterministic features can include a signal pattern, a sliding power window peak of the interfering signal, a maximum collision point, or a period of minimal noise, for example. Processing circuitry within the radar sensor module 12 can be configured as an interference detector, configured to programmatically identify the interfering signal by deterministic features, and also to associate the identified signal with a known interferer, as discussed in more detail herein. Finally, at step 306, an adjustment is made to the signal transmission of the radar module 12 of the host vehicle based on the results of the analysis and the timing of the interfering signal. For example, if the interfering signal is found to have a cyclic transmission pattern, the radar module 12 of the host vehicle can synchronize itself with the interferer by modifying its own transmission pattern and modifying its transmission timing to align with cyclic transmission pattern of the interfering signal. Alternatively, the radar module 12 can synchronize itself to transmit only during quiet periods of the interferer's transmission period where there is minimal noise from the interferer. Therefore, based on the adjustments made at step 306, the radar module 12 can resume (or continue transmission) of a radar signal at step 308.

Figure 4:
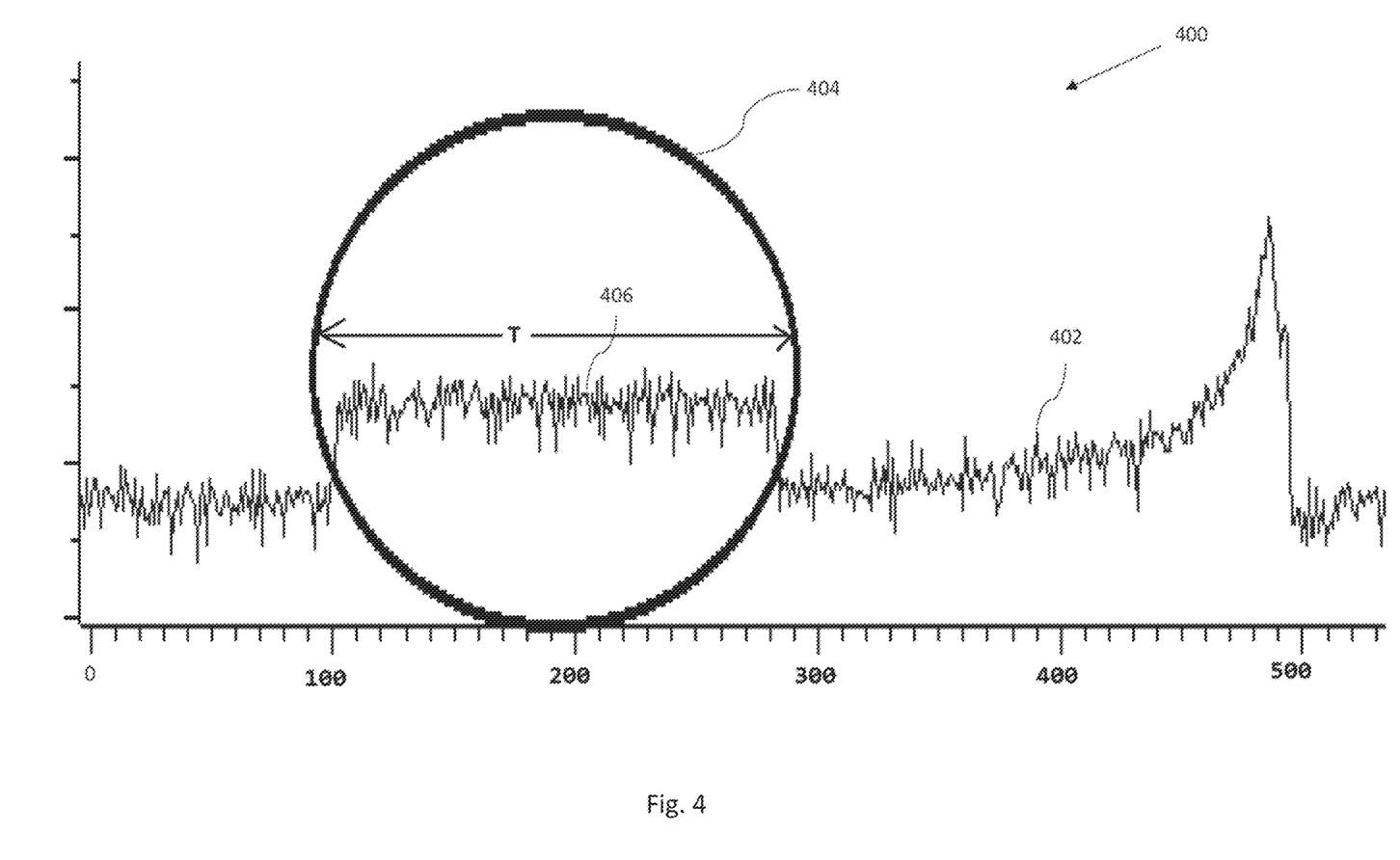
FIG. 4 is a graph corresponding to one method of mitigating RF interference from a third party in accordance with the subject technology.
Figure 5:
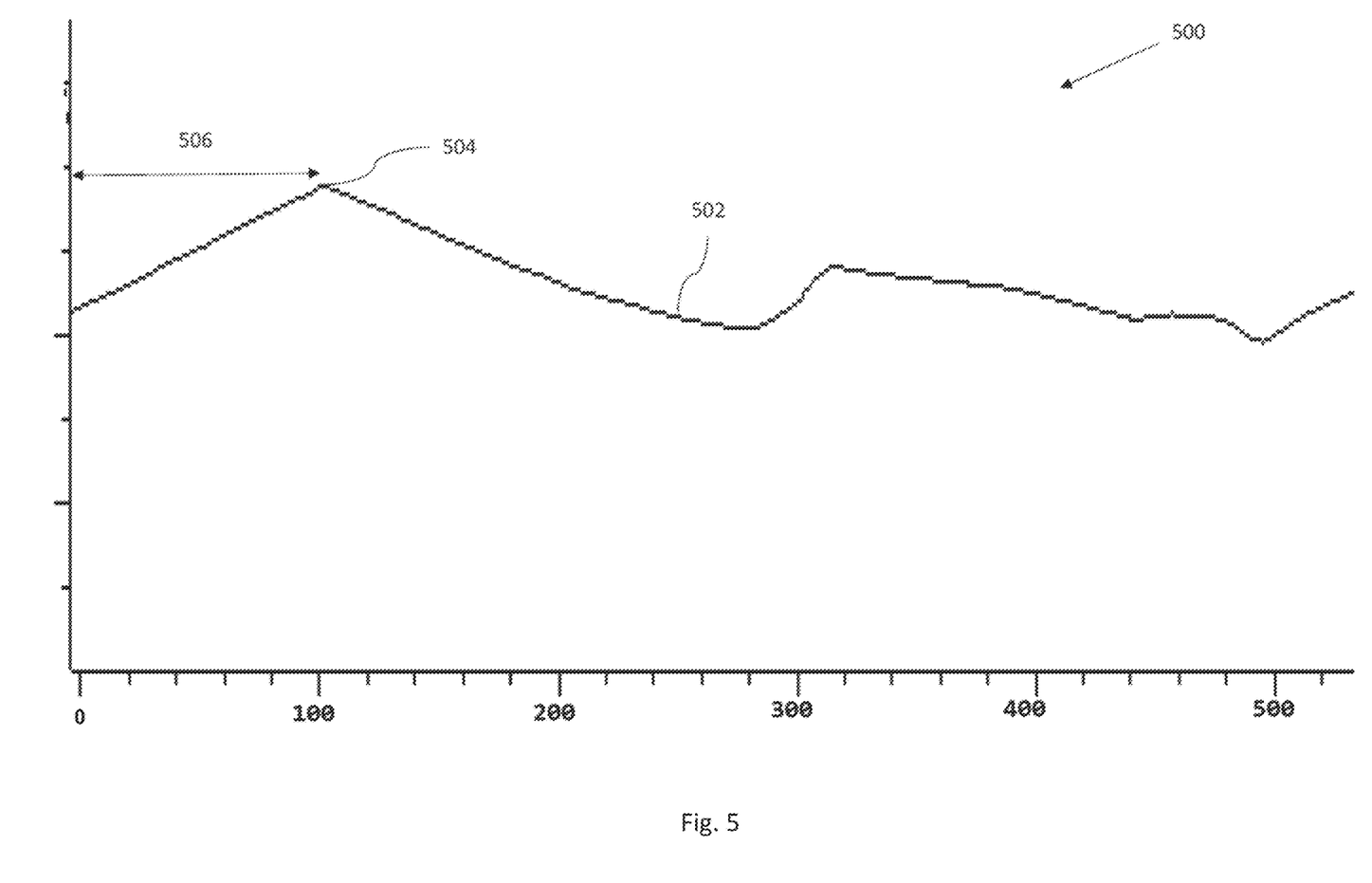
FIG. 5 is a graph corresponding to one method of mitigating RF interference from a third party in accordance with the subject technology.

Referring now to FIGS. 4-5, graphs of exemplary results of methods of analyzing an interferer's signal to mitigate RF interference are shown generally at 400 and 500. The methods related to the graphs of FIGS. 4-5 are typically carried out when the host vehicle is in a listening a mode. In general, the host vehicle contains a library (for example, within a data storage location within a radar sensing module) for documenting one or more potential interferer sources. The library contains data on other third party detection systems such as competitor automotive radar systems, its own family of radar and other radar signals which are known or have been encountered in the past. The data contained within the library includes a list of deterministic features to look for to identify a specific radar sensor. For each third party radar system, the library may contain data describing deterministic features, such as typical transmission patterns associated with the transmission signal of that radar system. The library may also contain data related to the known cyclical transmission periods of third party radar systems. This allows the host vehicle to identify an interferer and adjust its own signal to avoid the interferer's signal, or synchronize with the interferer's signal to transmit at a different frequency. It should be noted that while graphs 400, 500 provide a visual representation of how various goals of the subject technology are accomplished, creating a graph is by no means necessary to the subject technology. Most calculations and analysis described with respect to graphs 400, 500 are actually performed by processors without any visual graph being generated. This also holds true for the other graphs and graph lines discussed herein.

Turning to FIG. 4, the graph 400 shows noise received by the host vehicle's transceiver over time. The radar sensing module 12 of the host vehicle is set to look for a deterministic feature of that will identify the detected noise as being generated by a known detection system. For example, a particular power amplitude characteristic such as slope value, geometric shape, volume, height, or a higher order derivate value may all be deterministic of a certain competitor. As noise is received by the host vehicle and graphed over time graphical line 402 is generated. Eventually, within the sample time interval represented by circle 404, the rectangular noise pattern 406 is matched with information within the library as a deterministic feature of a known third party radar system. While the rectangular pattern 406 is given for exemplary purposes, the library may contain data on the patterns of many different radar systems, as discussed above, and the graph line 402 can be examined for numerous patterns from numerous competitors, sometimes simultaneously. From the identified rectangular pattern 406, the interferer who generated the signal is identified from the library. In other examples, an interferer could transmit another deterministic feature that allows the interferer to be identified, such as a slow chirp. In that case an algorithm would search a peak the shape of a rounded hill with a specific slope on two different graph collected while listening on two different frequencies to identify the interferer.

Once the interferer is identified, the interferer's transmission period and a time offset from the deterministic feature (pattern 406) to the start of the interferer's transmission can be determined from the library, and an adjustment can be made to the transmission period of the host vehicle's signal to synchronize with the interferer's signal. For example, the host vehicle can seek to transmit in a way that avoids the transmission of the interferer, or to transmit during a time where the interferer's signal is known and the host vehicle can transmit on a different frequency.

Referring now to FIG. 5, another graph of exemplary results of a method of identifying a noise pattern from an interferer is shown generally at 500. Overall, the method corresponding to the graph 500 of FIG. 5 is similar to the method corresponding to the graph 400 of FIG. 4, the main differences being a different deterministic feature is relied upon to identify the interferer and a different method of adjusting the host vehicles signal is relied upon. The method corresponding to graph 500 involves utilizing a power envelope to generate the data represented by graph 500. In particular, the sliding power window is applied to the graph 400 of FIG. 4 to generate the graph line 502. The sliding power window takes a time segment of a set length of time and views the total power received by the radar sensing module during segments of that time length over a larger time period. The segment which surrounds each time period is known as the "power window", which "slides" along the initial graphical representation of the power received over time (e.g., sliding over the graph of FIG. 4). Therefore, the sliding power window generates a graph (FIG. 5) representing total power in a particular time window over time. The sliding power window method is appropriate when an interferer continuously transmits during a fixed interval at a specific frequency.

In the example shown in the graph 500 of FIG. 5, relying on data from the graph 400 of FIG. 4, the length T (here being a difference of 200) of the power window is chosen. The summation window, represented on the graph 400 as circle 404, starts at the left side of the signal 406 at origin 0. The summation is performed under a window interval of length T. The result is stored as the leftmost point in output signal 502 (FIG. 5) at location 0. The window is shifted to the right by one sample and the summation is recalculated again under the window and stored as the $2^{nd}$ value in output signal 502 at location 1. The process is repeated until the window reaches the right side of the graph 400. In the example shown, the peak 504 represents the location where the sliding power window captures the greatest amount of power, represented in FIG. 4 by circle 404.

The peak 504 generated by the graph line 502 of this power sliding window can also be relied upon as a deterministic feature of an interferer. Once the interferer has been identified an offset time between the peak and a starting point is identified, this offset time being shown graphically as distance 506. This offset time can be relied upon to adjust the radar signal of the host vehicle to synchronize with the interferer. For example, if the interferer has a known cyclic transmission pattern and the deterministic feature has a known location within that transmission pattern, a temporal offset to the host vehicle's transmission can allow the host vehicle to synchronize with or avoid the interferer. Alternatively, in some cases, the sliding power window can also be relied upon to identify a starting and ending time of an interference signal that has a cyclic transmission pattern. The host vehicle's radar sensor module can then be synchronized with the interferer accordingly. For example, the host vehicle can provide a temporal delay to its own RF transmission start time with respect to the timing of the cyclic transmission pattern of the interferer. In another example, the host vehicle could temporally alternate the transmission of its own RF signals to alternate with the interferer. The identification of the interferer, as well as the resulting adjustments to the host vehicle's RF transmission, can be carried out by processing circuitry within the radar sensor module 12.

Figure 6:
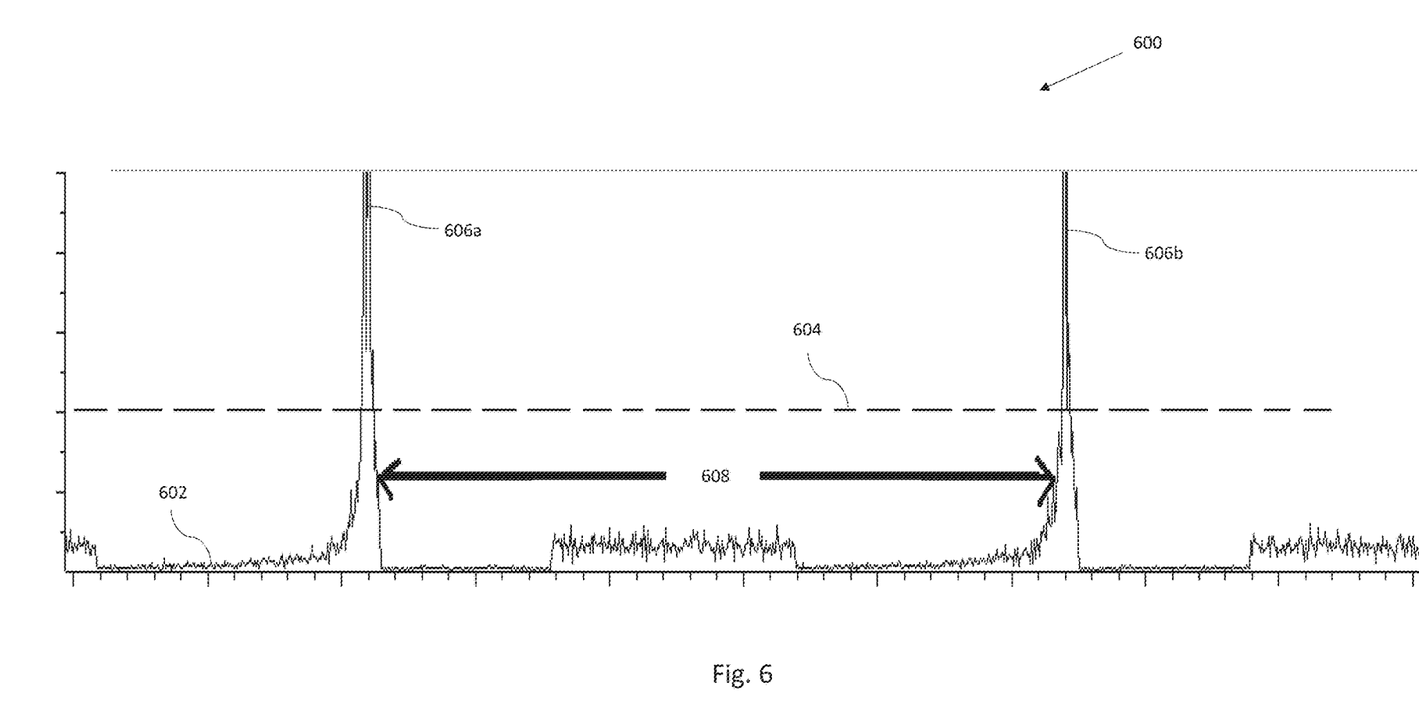
FIG. 6 is a graph corresponding to one method of mitigating RF interference from a third party in accordance with the subject technology.

Referring now to FIG. 6, a graph of exemplary results of a method of analyzing an interferer's signal is shown generally at 600. In general this method, which can be referred to as a threshold detection method, allows the host vehicle to continue transmitting while the interferer's signal is analyzed and seeks to find a maximum collision between the host vehicle and the interferer. A threshold detection method is appropriate when an interferer transmits a series of narrow windows of power.

The threshold detection method starts by receiving incoming RF signals from one or more sources, including at least the signal of the host vehicle and the signal of an interferer. Graph line 602 represents the power received from the incoming RF signals over time. A minimum threshold level 604 is set which determines the level of noise above which an interference peak indicating an interfering signal will be recognized. When the host vehicle and interferer operate on almost the same frequencies, a spike of noise occurs, causing peaks 606a, 606b in the graph line 602, the peaks 606a, 606b extending above the threshold level 604. These peaks 606a, 606b represent the maximum collision between the host vehicle and an interferer. Based on the time period between these peaks 606a, 606b, shown graphically as distance 608, the interferer's sweep period is calculated. Once the interferer's sweep period is known, the host vehicle can adjust its own transmission waveform such that it is never on the same frequency as the interferer. It should be noted that, like the other graphical representations of methods shown herein, the graph 600 is only shown as a visual representation of what can otherwise be accomplished programmatically, for example, within the radar module 12.

Figure 7:
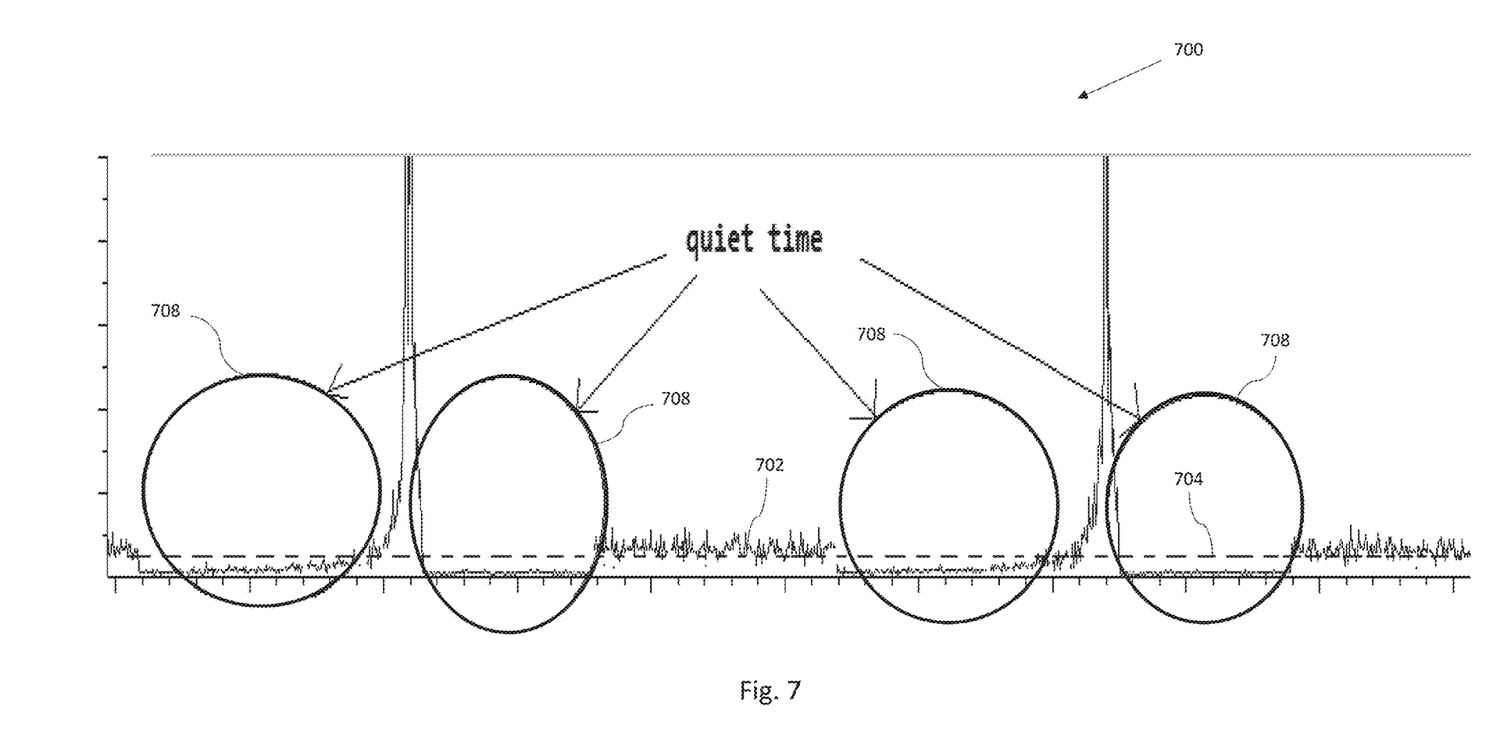
FIG. 7 is a graph corresponding to one method of mitigating RF interference from a third party in accordance with the subject technology.

Turning to FIG. 7, another graph of a method of analyzing an interferer's signal is shown generally at 700. The graph 700 of FIG. 7 depicts the same graph of noise detection over time as shown in the graph 600 of FIG. 6, but relies on a different method of determining the interferer's sweep and adjusting its own signal.

In the example of FIG. 7, the host vehicle turns off its transmission capabilities and enters a "listening" mode. In the listening mode, the host vehicle receives signals that are the result from transmissions of at least one third party radar system. In particular, the host vehicle can listen on a specific frequency upon which they hope to later transmit. The noise received by the host vehicle is graphed as line 702 over time. A maximum threshold value is determined, the maximum threshold value being denoted on the graph 700 by line 704. The maximum threshold value represents an upper limit of acceptable outside noise. When the total noise (graph line 702) falls below the maximum threshold value (graph line 704) a time period of acceptable noise, or "quiet" time period will exist. These quiet time periods are represented graphically within circles 708. During this process, the host vehicle assumes the interferer sweep repeats according to a constant cycle time. Therefore these quiet time periods 708 are repeated at known intervals. The host vehicle can then synchronize itself on the third party radar system by transmitting only during these quiet time periods, during which there will be an acceptable level of outside noise. The quiet periods 708 may also help identify the third party interferer, allowing the host vehicle to synchronize with the interferer as discussed herein. It should be noted that as with the other examples shown herein, the noise detection and resulting adjustments can be carried out within the radar sensor module 12, for example, by an interference detector.

Figure 8:
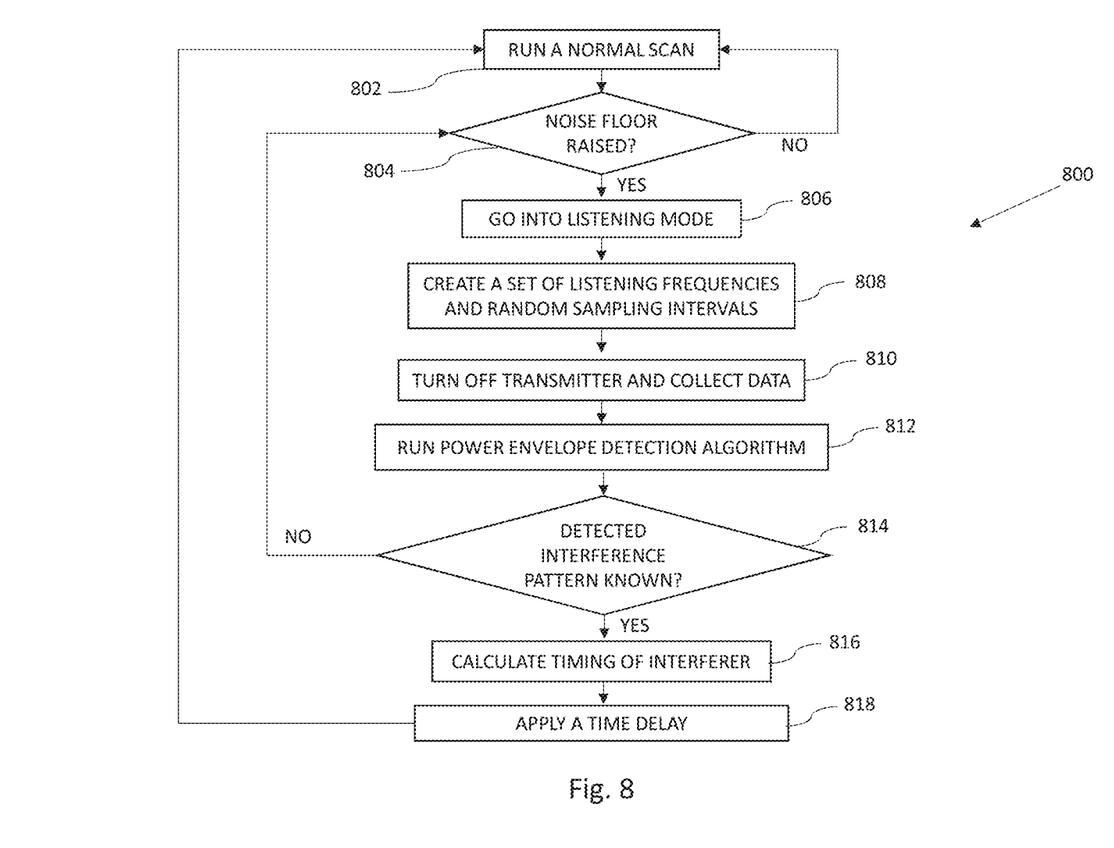
FIG. 8 is a flowchart of one method of mitigating RF interference from a third party in accordance with the subject technology.

Referring now to FIG. 8, a flowchart of a method of mitigating interference from an RF interferer is shown generally at 800. The method corresponding to the flowchart 800 can be carried out applying one or more of the various techniques and/or components as described above.

The method 800 starts with a host vehicle running a normal scan at step 802 to identify outside noise. At step 804, the radar module 12 of the host vehicle examines the incoming noise. If no outside noise is detected (or minimal outside noise) then the host vehicle can transmit its own RF signal and continue running normal scans at step 802. However, if the noise floor is raised, then host vehicle can shift into listening mode at step 806. Once in listening mode, the radar module 12 creates a set of listening frequencies and random sampling intervals at step 808. At step 810 the transmitter of the host vehicle is turned off entirely as the radar module 12 seeks to collect only data related to outside noise without the addition of signal created by its own transmissions. As the radar module 12 listens at the sampling intervals one of the various methods, as discussed herein, can be employed to detect an interferer. In the example shown in method 800, a power envelope detection algorithm is run (e.g. see discussion with respect to FIG. 5) to identify potential interferers at step 812. At step 814, if the interference pattern is unknown, the method 800 returns to step 804 and steps 804-814 are repeated, generating a new set of listening frequencies and random sampling intervals and attempting to identify the interferer. If the interferer is identified at step 814, the transmission period of that transmitter is identified, at step 816, in one of the various ways discussed above. For example, the timing of the interferer can be determined by referencing a library within the radar sensing module 12 which contains data related to the transmission period of known detection systems. At step 818, the host vehicle can then apply a temporal delay (or other temporal adjustment) to its own RF transmission period to synchronize with or avoid the interferer's transmission pattern.

Notably, while various methods of detecting an interferer are described herein, it should be noted that all of the above methods, or a combination of the above methods could be used. Additionally, other methods could also be used with the methods described above, relying on stored data within the library to identify third party detection systems.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g., modules, circuitry, controllers, memory and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

The invention claimed is:

1. A method of mitigating RF interference from an RF interferer, comprising:
   receiving at an RF transceiver during a time period an RF signal that includes, for at least a portion of the time period, an interference signal having a cyclic transmission pattern with at least one deterministic feature, the at least one deterministic feature allowing for the identification of an interfering signal associated with a known interferer;
   analyzing the received RF signal to identify the interfering signal and known interferer based on the at least one deterministic feature and determine timing information for the at least one deterministic feature and the associated interference signal cyclic transmission pattern, wherein analyzing the received RF signal comprises:
      measuring a power envelope of the received RF signal to identify the at least one deterministic feature and timing information associated therewith, wherein measuring the power envelope comprises application of a sliding power window to the received RF signal, the sliding power window taking a time segment of a set length and viewing total power received during all segments of that length over a time period; and
      comparing the identified at least one deterministic feature and timing information associated therewith to one or more known deterministic features associated with RF power envelope transmission patterns to identify a starting time and an ending time for the interference signal cyclic transmission pattern; and
   synchronizing transmission of RF signals from the RF transceiver with the interference signal transmission pattern based on the determined timing information to mitigate interference between the RF signals and the interference signal.

2. The method of claim 1, wherein the interference signal comprises a direct wave from an interferer RF transceiver.

3. The method of claim 2, wherein the receiving RF transceiver and the interferer RF transceiver transmit in the same frequency band.

4. The method of claim 1, further comprising accessing the one or more known deterministic features from a library of known transmission patterns for RF interferers.

5. The method of claim 1, wherein the interference signal transmission pattern includes at least one transition between RF transmission frequencies.

6. The method of claim 1, wherein receiving the RF signal further comprises scanning on a plurality of RF frequencies at random time intervals.

7. The method of claim 1, wherein synchronizing comprises temporally alternating the transmission of the RF signals with the determined timing of the cyclic transmission pattern of the interference signal.

8. The method of claim 1, wherein synchronizing comprises temporally delaying the transmission of the RF signals with respect to the determined timing of the cyclic transmission pattern of the interference signal.

9. The method of claim 1, wherein synchronizing comprises adjusting the transmission frequency of the RF signals based on at least one maximum collision point between the interference signal and previously transmitted RF signals.

10. The method of claim 1, wherein synchronizing comprises temporally adjusting the transmission of the RF signals to transmit only when noise from the interfering signal is below a maximum noise threshold.

11. The method of claim 1 further comprising adjusting the transmitted RF signals to have a cyclic transmission pattern that matches the cyclic transmission pattern of the interference signal.

12. The method of claim 1, wherein synchronizing comprises modifying the transmission pattern of the RF signals and aligning the transmission timing of the modified RF signals with the determined timing of the cyclic transmission pattern of the interference signal.

13. The method of claim 1, wherein the at least one deterministic feature occurs at a known temporal offset from the start and end of a known cyclic transmission pattern.

14. The method of claim 1, wherein the at least one deterministic feature comprises a power amplitude characteristic selected from: a slope value; a geometric shape; volume; height; and a higher order derivative value.

15. An RF transceiver configured to mitigate RF interference from an interference signal, comprising:
   an RF receiving module configured to receive, during a time period, an RF signal that includes for at least a portion of the time period an interference signal having a periodic cyclic transmission pattern with at least one deterministic feature, the at least one deterministic feature allowing for the identification of an interfering signal associated with a known interferer;
   an interference detector configured to analyze the received RF signal to identify the interfering signal and known interferer based on the at least one deterministic feature and determine timing information for the at least one deterministic feature and the associated interference signal cyclic transmission pattern, wherein the interference detector includes a controller configured to analyze the received RF signal by:
      measuring a power envelope of the received RF signal to identify the at least one deterministic feature and timing information associated therewith, wherein measuring the power envelope comprises application of a sliding power window to the received RF signal, the sliding power window taking a time segment of a set length and viewing total power received during all segments of that length over a time period; and
      comparing the identified at least one deterministic feature and timing information associated therewith to one or more known deterministic features associated with RF power envelope transmission patterns to identify a starting time and an ending time for the interference signal cyclic transmission pattern; and
   an RF transmitter configured to synchronize transmission of RF signals with the interference signal cyclic transmission pattern based on the timing information to mitigate interference between the RF signals and the interference signal.

16. The RF transceiver of claim 15, wherein the RF transceiver comprises an automotive radar transceiver.

17. The RF transceiver of claim 15, wherein the controller is further configured to access, from a library contained within memory, data related to the one or more known transmission patterns for detection systems such that the known transmission patterns can be compared to the received RF signal to identify the interferer based on the one or more deterministic features.

18. The RF transceiver of claim 15, wherein the RF receiving module receives the RF signal by scanning on a plurality of RF frequencies at random time intervals.

19. The RF transceiver of claim 15, wherein the controller is configured to synchronize the transmission of the RF signals by one of:
   temporally alternating the transmission of the RF signals with the determined timing of the cyclic transmission pattern of the interference signal;
   temporally delaying the transmission of the RF signals with respect to the determined timing of the cyclic transmission pattern of the interference signal; and
   modifying the transmission pattern of the RF signals and aligning the transmission timing of the modified RF signals with the determined timing of the cyclic transmission pattern of the interference signal.

20. The RF transceiver of claim 15, wherein the at least one deterministic feature occurs at a known temporal offset from the start and end of a known cyclic transmission pattern.

* * * * *